Perry & Lay.
Sheet 1, 3 Sheets.
Steam Engine.
No. 3,356. Fig. 1.
Reissued Mar. 30, 1869.
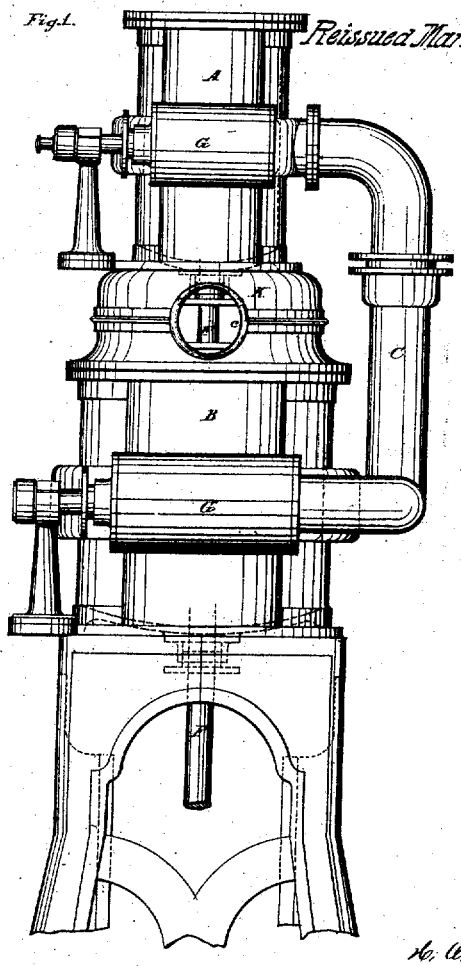
Witnesses
Jay Hyatt.
J. R. Ward.
Inventor.
Hy. A. Perry.
Jno. L. Lay
By J. Bruce & Co.
Attys.

Perry & Lay. Sheet 2, 3 Sheets.
Steam Engine.
No. 3,356 Reissued Mar. 30, 1869.
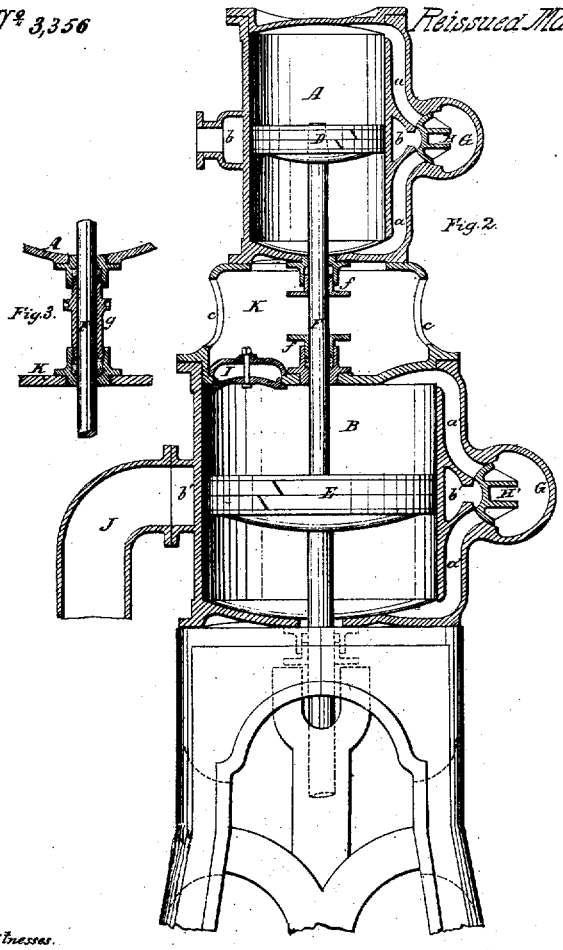
Witnesses.
Jay Wyatt,
J. R. Drake.
Inventor,
Jno L. Lay
by V. Bramlette
atty.

Sheet 3, 3 Sheets

Perry & Lay.

Steam Engine.

No. 3,356. Reissued Mar. 30, 1869.

Witnesses
Jay Hyatt.
J. R. Stalk

Inventors
H. A. Perry
Jno. L. Lay
By J. Bruce & Co
Attys.

United States Patent Office.

HORATIO O. PERRY AND JOHN L. LAY, OF BUFFALO, NEW YORK.

*Letters Patent No.* 65,003, *dated May* 21, 1867; *reissue No.* 3,356, *dated March* 30, 1869.

IMPROVEMENT IN RECIPROCATING STEAM-ENGINES.

The Schedule referred to in these Letters Patent and making part of the same

*To all whom it may concern:*

Be it known that we, HORATIO O. PERRY and JOHN L. LAY, both of the city of Buffalo, in the county of Erie, and State of New York, have invented certain new and useful Improvements in Marine Steam-Engines; and we hereby declare that the following is a full and exact description thereof, reference being had to the accompanying drawings, making part of this specification, in which—

Figure 1 is a view in elevation.

Figure 2 is a vertical section.

Figure 3 is a detached view of a modification of the stuffing-boxes for packing the piston between the cylinders.

Like letters indicate corresponding parts in all the figures.

Figure 4:
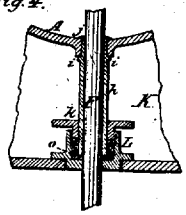
Figure 4 is a detached view, representing a different method of packing the piston-rod, by which one stuffing-box suffices for packing the rod at both cylinders.
Figure 5:
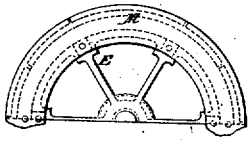
Figures 5 and 6 are a plan and section of a portion of the piston, showing the method of applying the packing.

Our invention relates to that class of vertical engines in which two cylinders are employed, one placed over, or upon the other, and in which the steam may be first used at high pressure, and then exhausted into a low-pressure cylinder, acting, in both, upon pistons arranged upon the same rod.

Hitherto, in engines of this kind, access to the stuffing-boxes, in the head, or partition dividing the two cylinders, has been attended with much difficulty and expense, necessitating the removal of the outer head and piston from one cylinder before the stuffing-box of the inner head could be reached, in fact, involving the stoppage and taking apart of the engine before repacking and ordinary repairs could be effected, and this, of itself, unfits them for marine purposes.

Our invention is designed to obviate this objection, as well as in other respects to adapt these engines to the purposes of navigation, especially on lake-propellers, where, from the large amount of stowage-room required below deck, space for the engine is restricted.

It consists in the combination and arrangement of the two vertical steam-cylinders, in such a manner as to produce a chamber, or intervening space between their interior, or proximate heads, for the purpose of rendering the stuffing-box, or boxes of the piston-rod, or any part thereof, accessible when the engine is working, and at all times, without the removal of any part of the engine; and in packing the rod in the proximate heads of the two cylinders by means of a single stuffing-box; and also, in the combination and arrangement of a man hole in the bottom plate of said chamber, or top head of the lower cylinder, whereby the packing may be removed without removing the cylinder-head, and in other features hereinafter described.

As represented in the drawings,

A is the high-pressure cylinder, in which the steam is used direct from the boiler.

The exhaust-pipe C, from the cylinder, leads directly to the valve-chest of the larger cylinder B, in which the steam is employed expansively, acting in both cylinders on pistons, E D, affixed to the same rod, F.

G G′ are the valve-chests.

H H, the valves.

*a a′*, the induction-passages, and *b b′*, the exhaust-ports, the former communicating, by the pipe C, with the cylinder B, and the latter leading, by the pipe J, to the condenser.

The chamber, or space, intervening between the cylinders A and B, may be occupied by the cylinder K, which is, preferably, cast as a shell, having suitable openings, *c c*, for entrance through its sides, its top forming a seat for the base of cylinder A, and its bottom plate formed with a flange, for bolting to the sides of the lower cylinder, thereby dispensing, if desired, with the usual cylinder-head.

A removable section, constituting a man-hole, I, having a suitable crab, is also provided in the bottom plate, or proximate head of the cylinder B, whereby access is readily obtained to the piston E, as will be presently described. It may, however, be constructed with columns supporting the upper plate, or head of cylinder A, instead of the enclosed sides, with equally good results.

In the chamber K, the stuffing-boxes may be constructed in the ordinary method, one for each cylinder, as shown at *f f*, in fig. 2, or, as in fig. 3, where a single sleeve, *g*, provided with an external screw-thread, working in both boxes, forms a gland for both.

We prefer, however, the construction shown in fig. 4, in which the sleeve *h*, enclosing the piston-rod, forms an extension of the head, or, if a separate piece, passes through the lower head of cylinder A, and is connected thereto by means of the shoulder *i* below, and a flange, J, turned over above, or on the interior of the head.

This sleeve, being thus connected steam-tight with cylinder A, extends downward in chamber K, terminating in a stuffing-box, L, therein, and having a ring, *o*, surrounding it below the packing *l*.

The gland *k* surrounds the sleeve *h*, as well as the piston-rod, and the packing is compressed between it and the ring *o*, which latter is not in contact with the rod, and hence not subject to wear, but intervenes between the steam and packing.

The use of this device dispenses with the construction and care of one stuffing-box, and, in connection with the space, or chamber K, simplifies the construction of this part of the engine.

The chamber K, by admitting space in which to use the man-hole plate I, enables us to introduce an improvement in the piston E, by which the packing-rings may be removed and replaced without taking out the piston, or removing the cylinder-head.

Figure 7:
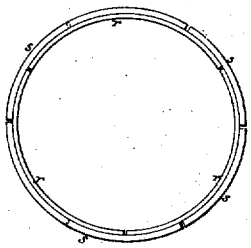
Figures 7 and 8 are a plan and elevation of the packing-rings detached.
Figure 6:
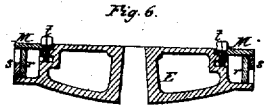
Figure 8:
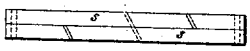

We construct the piston with an adjustable follower, consisting of a ring, M, which is bolted to the main casting of the piston, and covers a recess for the packing-rings, *r s*. By loosening the bolts *t t*, the follower may be raised sufficiently to admit of the removal of the packing-rings *r s*, (which are cut into three or more sections, as shown in figs. 7 and 8,) by hoisting through the man-hole. This is of great importance, in cylinders of large diameter, in the saving of time and expense.

Connected with the exhaust of the high-pressure cylinder, is a steam-pipe, O, communicating directly with the boiler, so that when the engine is stopped, for reversing, steam may, by opening a valve in this pipe, be admitted into the large cylinder, in order to reverse quickly.

Our improvements are particularly adapted to engines used for lake-navigation, where compactness and simplicity are demanded, without the sacrifice of power. They are of a character which enables the upright engines, now in use on lake-propellers and other vessels, to be modified to this construction by the addition, simply, of the high-pressure cylinder A, with its adjuncts, to the present cylinder of those engines.

What we claim as our invention, and desire to secure by Letters Patent, is—

1. A vertical compound-engine, A B, having a continuous piston-rod, the cylinders being united by a connection, or connections, which form a space between the proximate heads of said cylinders, substantially as set forth.

2. The combination and arrangement of the shell, or frame surrounding the intervening chamber K, with the two cylinders, A and B, the bottom plate connected with, or forming the cover of the cylinder B, constructed substantially as herein set forth.

3. Also, the sleeve *h*, or equivalent extension of the cylinder-head, and packing-box L, in combination with the cylinders A B, arranged and operating substantially as set forth.

4. In combination with the two cylinders, A and B, and chamber K, arranged as described, the removable section forming the man-hole I, whereby access is had to the interior of the lower cylinder, substantially as herein set forth.

5. Also, so combining and arranging the two cylinders, A and B, where a continuous piston-rod is employed, that both cylinders may be packed around said rod, by the use of a single stuffing-box, in a space intervening between the two cylinders, substantially as described, or other equivalent means.

6. Also, so constructing the frame, shell, or casting K, that while it serves the purpose of connecting the two cylinders, and sustaining one upon the other, it shall also serve as a head, or cover, for the proximate ends of one or both cylinders, substantially as shown and described.

7. The sustaining part K, or its equivalent, surrounding the piston-rod, between the proximate heads of the two cylinders, said portion acting as the support of the upper cylinder, and dispensing with any extraneous frame for the purpose, and thereby forming a compact arrangement and construction for a marine engine, substantially as set forth.

In witness whereof, we have hereunto signed our names, in the presence of two subscribing witnesses.

HORATIO O. PERRY.
JOHN L. LAY.

Witnesses:
ALBERT HAIGHT.
J. R. DRAKE.